US011885374B2

(12) United States Patent
Ishikura et al.

(10) Patent No.: US 11,885,374 B2
(45) Date of Patent: Jan. 30, 2024

(54) POWER TRANSMISSION SHAFT

(71) Applicant: HITACHI ASTEMO, LTD., Hitachinaka (JP)

(72) Inventors: Kenichiro Ishikura, Hitachinaka (JP); Xiaojin Zhu, Hitachinaka (JP); Toshiyuki Masuda, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 29 days.

(21) Appl. No.: 17/788,051

(22) PCT Filed: Dec. 23, 2020

(86) PCT No.: PCT/JP2020/048138
§ 371 (c)(1),
(2) Date: Jun. 22, 2022

(87) PCT Pub. No.: WO2021/132319
PCT Pub. Date: Jul. 1, 2021

(65) Prior Publication Data
US 2023/0332638 A1    Oct. 19, 2023

(30) Foreign Application Priority Data
Dec. 23, 2019   (JP) .................. 2019-231037

(51) Int. Cl.
*F16C 3/02*     (2006.01)
*B60K 17/22*    (2006.01)
(Continued)

(52) U.S. Cl.
CPC .............. *F16C 3/023* (2013.01); *B60K 17/22* (2013.01); *F16D 1/076* (2013.01); *F16D 3/06* (2013.01); *F16C 2226/80* (2013.01)

(58) Field of Classification Search
CPC . B60K 17/22; F16D 3/06; F16D 1/076; F16C 2226/80; F16C 3/023
See application file for complete search history.

(56) References Cited

U.S. PATENT DOCUMENTS

| | | | |
|---|---|---|---|
| 11,493,093 B2 * | 11/2022 | Mabe ...................... F16C 3/023 |
| 2018/0023629 A1 * | 1/2018 | Sugiyama ............... F16D 3/226 |
| | | | 464/143 |

(Continued)

FOREIGN PATENT DOCUMENTS

| | | | |
|---|---|---|---|
| WO | WO-2019/054167 A1 | 3/2019 | |
| WO | WO-2020081028 A2 * | 4/2020 | ............. B60K 17/22 |

OTHER PUBLICATIONS

International Preliminary Report on Patentability dated Jul. 7, 2022 issued in International Application No. PCT/JP2020/048138, with English translation, 10 pages.

(Continued)

*Primary Examiner* — Faye M Fleming
(74) *Attorney, Agent, or Firm* — FOLEY & LARDNER LLP (57) ABSTRACT

A propeller shaft (PS) has a balance piece (9) on the outer peripheral side of a stub shaft body section (31) of a stub shaft (3), which is axially separated from both spline sections (25, 34), which are spline fitting sections. Due to this configuration, changes in the gap in both spline sections (25, 34) when the balance piece (9) is welded are minimized, and the occurrence of new rotational imbalance can be minimized. As a result, rotational imbalance in the propeller shaft (PS) due to the balance piece (9) can be corrected appropriately and easily.

8 Claims, 3 Drawing Sheets

(51) Int. Cl.
*F16D 3/06* (2006.01)
*F16D 1/076* (2006.01)

(56) References Cited

U.S. PATENT DOCUMENTS

2020/0370603 A1 11/2020 Mabe et al.
2022/0349447 A1* 11/2022 Sato .................. F16J 15/52

OTHER PUBLICATIONS

International Search Report dated Feb. 22, 2021 issued in International Application No. PCT/JP2020/048138, with English translation, 6 pages.

* cited by examiner

POWER TRANSMISSION SHAFT

TECHNICAL FIELD

The present invention relates to a power transmission shaft.

BACKGROUND ART

Patent Document 1 below discloses an example of a conventional power transmission shaft.

This power transmission shaft includes a tubular shaft member, a first connection tube, and a second connection tube. The first connection tube is connected to a first end of the shaft member, and is connected to a transmission of a vehicle via a constant speed joint movable axially. The second connection tube is connected to a second end of the shaft member, and is connected to a differential of the vehicle via a fixed rubber joint. Furthermore, the first connection tube includes an outer periphery to which a weight is mounted for adjustment against imbalance in rotation of the power transmission shaft.

PRIOR ART DOCUMENT(S)

Patent Document(s)

Patent Document 1: WO 2019/054167 A1

SUMMARY OF THE INVENTION

Problem(s) to be Solved by the Invention

Recently, such power transmission shaft is under improvement for more effective reduction of vibration therein, by connecting the first end of the shaft member to the transmission of the vehicle via a rubber joint instead of the constant speed joint.

In this case, the rubber joint and the shaft member are arranged to interpose therebetween a spline sliding part for expansion and contraction of the power transmission shaft. However, the spline sliding part is likely to be deformed by heat due to the welding, if the weight is mounted to the first connection tube similarly to the conventional power transmission shaft. This may cause another factor for imbalance in rotation of the power transmission shaft, and impede correction of the imbalance.

In view of the foregoing technical problem of the conventional power transmission shaft, it is desirable to provide a power transmission shaft that facilitates correction of imbalance in rotation of the power transmission shaft.

Means for Solving the Problem(s)

According to one aspect of the present invention, a weight member is welded to an outer periphery of a sliding unit body, in a region between a first boot end and a joint in a direction of a rotational axis of a power transmission shaft.

Effect(s) of the Invention

The present invention serves to facilitate correction of imbalance in rotation of a power transmission shaft.

MODE(S) FOR CARRYING OUT THE INVENTION

Figure 1:
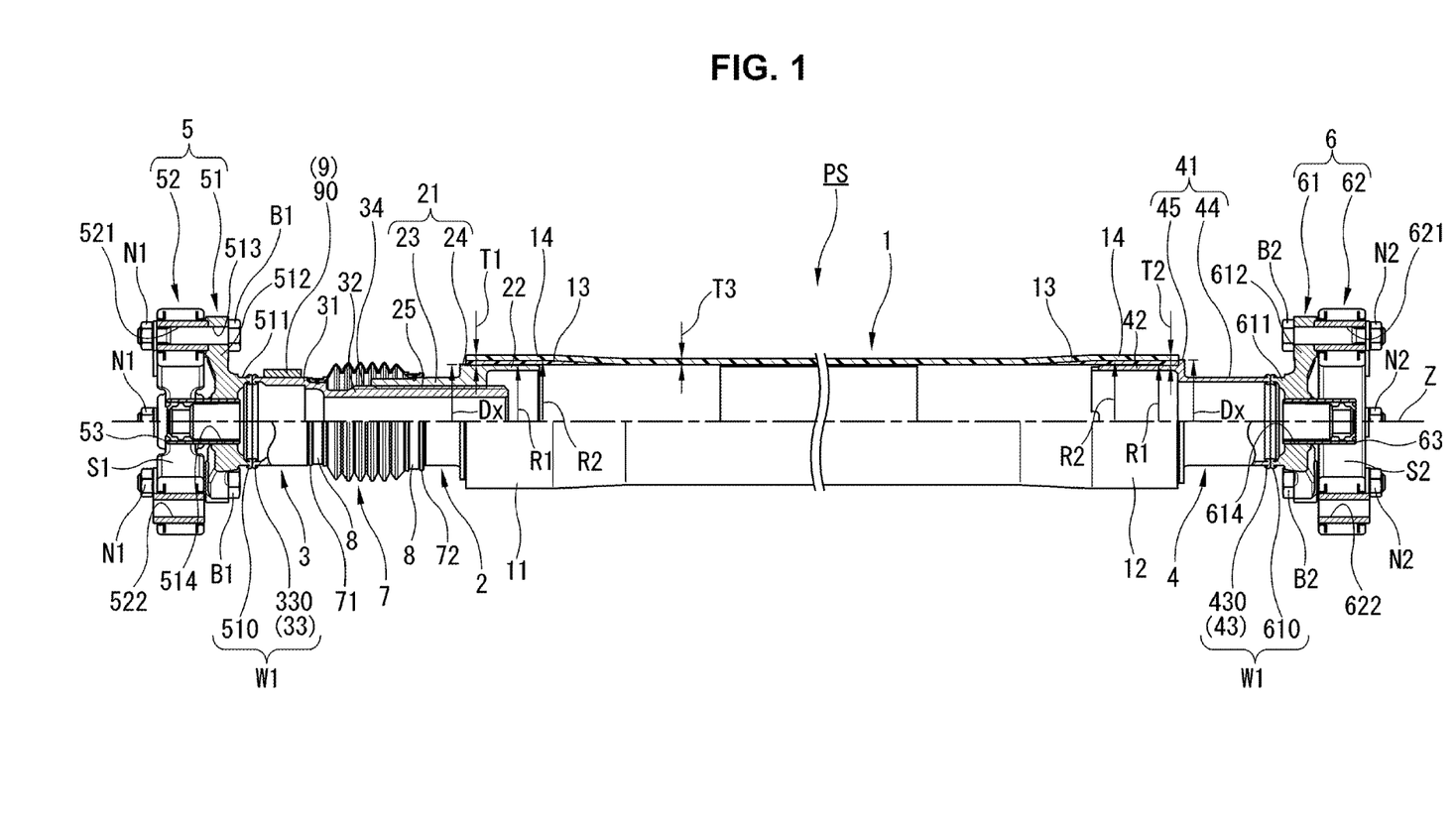
FIG. 1 is a half longitudinal sectional view showing an entire part of a propeller shaft according to the present invention.

The following details a power transmission shaft according to a first embodiment of the present invention, with reference to the drawings. The first embodiment shows an example of the power transmission shaft employed as a propeller shaft for a vehicle similarly to the conventional power transmission shaft. In the following description, for convenience of explanation, the left side in FIG. 1 is referred to as "front" side, and the right side in FIG. 1 is referred to as "rear" side. Furthermore, "axial direction" refers to a direction along a rotational axis Z in FIG. 1, and "radial direction" refers to a direction perpendicular to the rotational axis Z, and "circumferential direction" refers to a direction around the rotational axis Z.

Figure 2:
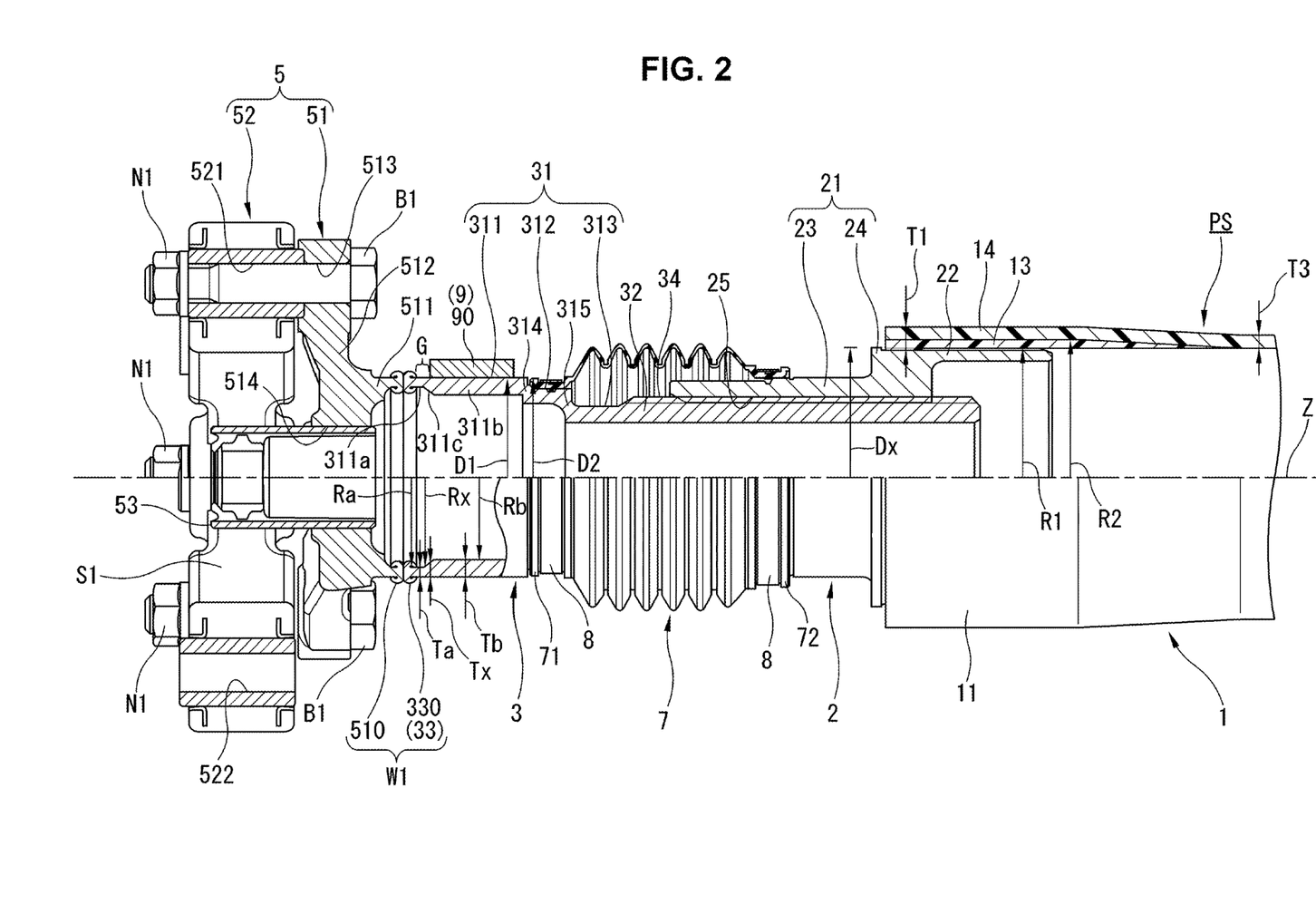
FIG. 2 is an enlarged view of a focused part of a power transmission shaft according to a first embodiment of the present invention.

(Configurations of Propeller Shaft) FIG. 1 is a half longitudinal sectional view of the power transmission shaft in the axial direction, which shows an entire part of propeller shaft PS as the power transmission shaft according to the present invention. FIG. 2 is a half sectional view enlarging a front end part of propeller shaft PS shown in FIG. 1: in detail, enlarging a part on the front side with respect to a tube first end 11 of propeller shaft PS.

As shown in FIG. 1, propeller shaft PS is disposed to extend in a frontward-rearward direction of a vehicle, and is interposed between a first shaft not shown and a second shaft not shown, wherein the first shaft is disposed in a front part of the vehicle and the second shaft is disposed in a rear part of the vehicle. In case that the vehicle is so-called Front engine Rear drive (FR) type one, the first shaft corresponds to an output shaft of a transmission disposed in the front part of the vehicle and structured to receive torque from a drive source such as an engine or a motor, while the second shaft corresponds to an input shaft of a differential disposed in the rear part of the vehicle and structured to transfer torque to wheels of the vehicle.

Propeller shaft PS according to the present embodiment is a propeller shaft of so-called one piece structure, and includes a front end connected to the first shaft via a first joint unit 5 and a rear end connected to the second shaft via a second joint unit 6. In detail, propeller shaft PS includes: a tube 1 having a cylindrical shape and including axial ends both open; a sleeve shaft 2 serving as a connection tube inserted in a tube first end 11 being a first end of tube 1; a stub shaft 3 serving as a sliding unit connected to sleeve shaft 2 so as to be relatively movable with respect to sleeve shaft 2 in the axial direction; a collar shaft 4 inserted in a tube second end 12 being a second end of tube 1; first joint unit 5 disposed adjacently to a front end of stub shaft 3; and second joint unit 6 disposed adjacently to a rear end of collar shaft 4.

As shown in FIGS. 1 and 2, tube 1 has a cylindrical shape with an inner radius R1 constant in the axial direction, and is made of a Carbon Fiber Reinforced Plastic (CFRP). Furthermore, tube 1 is formed such that each of a wall thickness T1 of tube first end 11 and a wall thickness T2 of tube second end 12 is thicker than a wall thickness T3 of other ordinary portions of tube 1.

Sleeve shaft 2 includes a sleeve shaft body 21 and a sleeve shaft insertion section 22. Sleeve shaft body 21 serves as a connection tube body exposed outside from tube first end 11 and connected to stub shaft 3. Sleeve shaft insertion section 22 serves as an insertion section disposed to extend from a rear end of sleeve shaft body 21 in the axial direction and inserted inside of tube first end 11. Sleeve shaft body 21 and sleeve shaft insertion section 22 are formed integrally and made of a predetermined metallic material. Sleeve shaft body 21 includes a sleeve shaft base section 23 and a sleeve shaft flange section 24. Sleeve shaft base section 23 extends frontward. Sleeve shaft flange section 24 increases in diameter rearward from a rear end of sleeve shaft base section 23 so as to form a step, and is connected to sleeve shaft insertion section 22. Sleeve shaft insertion section 22 is fixed to tube 1 by serration coupling so as to be rotatable integrally with tube 1.

Sleeve shaft flange section 24 has an outer radius Dx greater than an inner radius R1 of an inner peripheral layer 13 of tube first end 11 and less than an inner radius R2 of an outer peripheral layer 14 of tube first end 11. Thus, propeller shaft PS is structured such that sleeve shaft body 21 enters an inside of tube 1 while stripping inner peripheral layer 13 and expanding outer peripheral layer 14 radially outwardly with use of sleeve shaft flange section 24, in response to an axial compression load inputted to propeller shaft PS due to collision etc. of the vehicle not shown. This so-called collapse structure allowing sleeve shaft body 21 to sink into tube 1 serves to buffer the compression load and absorb collision energy upon collision of the vehicle, while suppressing propeller shaft PS from being bent toward a body of the vehicle.

Sleeve shaft 2 includes in its inner periphery an internal spline 25 extending in the axial direction and fitting with an external spline 34 described below of stub shaft 3 for establishing connection with stub shaft 3. This fitting of internal spline 25 of sleeve shaft 2 and external spline 34 of stub shaft 3 allows sleeve shaft 2 and stub shaft 3 to rotate integrally, while allowing stub shaft 3 to move in the axial direction relatively with respect to sleeve shaft 2.

Stub shaft 3 includes a stub shaft body 31, a sleeve side connection section 32, and a first joint welding section 33. Stub shaft body 31 has a cylindrical shape, and serves as a sliding unit body. Sleeve side connection section 32 is disposed adjacently to a rear end of stub shaft body 31, and is connected to sleeve shaft 2 by spline fitting so as to be movable in the axial direction relatively with respect to sleeve shaft 2. First joint welding section 33 is disposed adjacently to a front end of stub shaft body 31, and is connected to first joint unit 5 by welding (specifically, known friction stir welding). Stub shaft body 31, sleeve side connection section 32, and first joint welding section 33 are formed integrally and made of a predetermined metallic material.

Stub shaft body 31 includes a large diameter section 311, a middle diameter section 312, and a small diameter section 313, and decreases stepwise in diameter from the front end toward the rear end of stub shaft body 31. Large diameter section 311 is disposed at the front end of stub shaft body 31, and is relatively thin in wall thickness, and includes a stub thin section 311a connected to first joint welding section 33 and a stub thick section 311b connected to middle diameter section 312. Stub thick section 311b is greater in wall thickness than stub thin section 311a. In other words, large diameter section 311 is formed such that an inner radius Rb of stub thick section 311b is less than an inner radius Ra of stub thin section 311a, while large diameter section 311 is substantially constant in outer diameter over an entire axial range including stub thin section 311a and stub thick section 311b.

Stub thin section 311a has wall thickness Ta being slightly thinner than a first joint thin section 511a described below of first joint unit 5 welded by friction stir welding, and plastically flows due to the friction stir welding and thereby forms a stub curl portion 330 in the front end of stub shaft body 31. Stub thick section 311b has a wall thickness Tb being substantially constant in the axial direction, and is connected to middle diameter section 312 via a first step section 314. Stub thin section 311a and stub thick section 311b of large diameter section 311 interpose therebetween a thickness gradual change section 311c having a wall thickness Tx increasing gradually from stub thin section 311a toward stub thick section 311b. Thickness gradual change section 311c is formed by gradually reducing an inner radius Rx of large diameter section 311 from stub thin section 311a toward stub thick section 311b.

Large diameter section 311 has an outer radius D1 greater than an outer radius D2 of a boot first end 71 being a first end of a boot 7. In other words, large diameter section 311 and boot first end 71 are in a dimensional relation in which boot first end 71 is contained within a radial range of first step section 314 described below, and does not project radially outwardly with respect to an outer peripheral surface of large diameter section 311 after installation of boot 7.

Middle diameter section 312 is reduced in diameter in comparison with large diameter section 311 so as to form the step, and includes a front end connected to large diameter section 311 via first step section 314 and a rear end connected to small diameter section 313. Similarly, small diameter section 313 is reduced in diameter in comparison with middle diameter section 312 so as to form a step, and includes a front end connected to middle diameter section 312 via a second step section 315 and a rear end connected to sleeve side connection section 32.

Large diameter section 311 of stub shaft body 31 includes the outer peripheral surface to which a balance piece 9 serving as a weight member for correction of imbalance in rotation of propeller shaft PS is mounted and fixed by welding such as projection welding. Balance piece 9 includes a weight 90 being a weight body substantially constant in thickness, and includes a melting projection (not shown) for the projection welding which projects from an inner face of balance piece 9 and serving. Weight 90 is an arc-shaped plate formed by curving a plate weight into an arc shape in order to achieve a curvature in conformance with the outer peripheral surface of large diameter section 311 of stub shaft body 31. Balance piece 9 is disposed such that a front end of weight 90 is apart from first joint welding section 33 (i.e., apart from a stub curl portion 330 described below) in the axial direction. In other words, balance piece 9 is mounted to an axial position to avoid interference between balance piece 9 and first joint welding section 33 (stub curl portion 330).

Sleeve side connection section 32 includes in its outer periphery the external spline 34 structured to fit with internal spline 25 of sleeve shaft 2. External spline 34 is formed to extend in the axial direction over an entire axial range of sleeve side connection section 32. The fitting of internal spline 25 of sleeve shaft 2 and external spline 34 of stub shaft 3 allows sleeve shaft 2 and stub shaft 3 to rotate integrally, while allowing stub shaft 3 to move in the axial direction relatively with respect to sleeve shaft 2.

First joint welding section 33 is a welding section formed in stub shaft 3 by the friction stir welding, and includes in an outer periphery thereof the stub curl portion 330 formed due to the friction stir welding. Stub curl portion 330 is formed continuously in the circumferential direction over an entire length of an outer peripheral circumference of the front end of stub shaft 3, due to the plastic flow of stub thin section 311a upon the friction stir welding. In detail, stub curl portion 330 is substantially arc-shaped at a longitudinal section, and has a flange shape projecting radially outwardly as warping away from a welding surface between stub shaft 3 and first joint unit 5.

Collar shaft 4 includes a collar shaft body 41, a collar shaft insertion section 42, and a second joint welding section 43. Collar shaft body 41 has a cylindrical shape. Collar shaft insertion section 42 extends from a front end of collar shaft body 41 in the axial direction, and is inserted inside of tube second end 12. Second joint welding section 43 is disposed adjacently to a rear end of collar shaft body 41, and is connected to second joint unit 6 by welding (specifically, known friction stir welding). Collar shaft body 41, collar shaft insertion section 42, and second joint welding section 43 are formed integrally and made of a predetermined metallic material.

Collar shaft body 41 includes a collar shaft base section 44 and a collar shaft flange section 45. Collar shaft base section 44 extends rearward. Collar shaft flange section 45 increases in diameter frontward from a front end of collar shaft base section 44 so as to form a step, and is connected to collar shaft insertion section 42. Collar shaft insertion section 42 is fixed to tube 1 by serration coupling so as to be rotatable integrally with tube 1.

Similarly to sleeve shaft flange section 24, collar shaft flange section 45 has outer radius Dx greater than inner radius R1 of inner peripheral layer 13 of tube second end 12 and less than inner radius R2 of outer peripheral layer 14 of tube 1. Thus, propeller shaft PS is structured such that collar shaft body 41 enters the inside of tube 1 while stripping inner peripheral layer 13 of tube second end 12 and expanding outer peripheral layer 14 radially outwardly with use of collar shaft flange section 45. This serves to absorb collision energy upon collision of the vehicle, while suppressing propeller shaft PS from being bent toward the body of the vehicle.

Second joint welding section 43 is a welding section formed in collar shaft 4 by the friction stir welding, and includes in an outer periphery thereof a collar curl portion 430 formed due to the friction stir welding. Collar curl portion 430 is formed continuously in the circumferential direction over an entire length of an outer peripheral circumference of the rear end of collar shaft 4. In detail, collar curl portion 430 is substantially arc-shaped (or crescent-shaped) at a longitudinal section, and has a flange shape projecting radially outwardly as warping away from a welding surface between collar shaft 4 and second joint unit 6.

First joint unit 5 is a joint unit connected to stub shaft 3 via a first friction stir welding part W1, and includes a first joint base section 51 for connection with stub shaft 3, and a first joint 52 formed separately from first joint base section 51 and connected integrally to first joint base section 51 with first bolts B1 and first nuts N1. First joint 52 is fastened with the first shaft not shown with bolts not shown, in the front end of first joint unit 5. This connects the first shaft to propeller shaft PS integrally rotatably.

First joint base section 51 includes a first annular section 511 and a plurality of (e.g., three or four) first flange yokes 512. First annular section 511 has a substantially annular shape, and is disposed in a central part of first joint base section 51. First flange yokes 512 extend radially outwardly from first annular section 511, and are connected to first joint 52 via first bolts B1 and first nuts N1. First annular section 511 and first flange yokes 512 are formed integrally and made of a predetermined metallic material. The central part of first joint base section 51 further includes a first bush hole 514 facing a first central space S1 of first joint 52 described below. First bush hole 514 is a through hole extending in the axial direction, and receives a first centering bush 53 press-fitted therein.

First annular section 511 has a shape of a step, and includes a front section formed relatively thick and a rear section formed relatively thin. In detail, first annular section 511 includes a first joint thin section 511a in a rear end thereof and a first joint thick section 511b in a front end thereof, wherein first joint thin section 511a is relatively thin in wall thickness and is joined to stub shaft 3 by friction stir welding, and first joint thick section 511b is relatively thick in wall thickness and is connected to first flange yokes 512. The friction stir welding causes a rear end of first joint thin section 511a to plastically flow, and forms a first joint curl portion 510 in the rear end. According to the present embodiment, first joint curl portion 510 and stub curl portion 330 compose first friction stir welding part W1.

Each of first flange yokes 512 includes in its tip a first yoke through hole 513 pierced by a corresponding one of first bolts B1. Each of first yoke through holes 513 in the tips of first flange yokes 512 faces a corresponding one of first bolt through holes 521 of first joint 52. First bolts B1 pierce first yoke through holes 513 and first bolt through holes 521, and fasten and join first joint 52 to first flange yokes 512.

First joint 52 is a known rubber coupling having a substantially annular shape and including in its central part the first central space 51 with a substantially circular shape, and includes first bolt through holes 521 and first shaft side bolt through holes 522. First bolt through holes 521 are arranged at substantially equal intervals in the circumferential direction, and serve for connection with first joint base section 51 (i.e., connection with first flange yokes 512). First shaft side bolt through holes 522 are arranged at substantially equal intervals between first bolt through holes 521 in the circumferential direction, and serve for connection with the first shaft not shown. First joint 52 and first joint base section 51 are connected and fixed to each other integrally rotatably, by screwing first nuts N1 respectively to first bolts B1 piercing first bolt through holes 521 of first joint 52 and first yoke through holes 513 of first flange yokes 512. Similarly, first joint 52 and the first shaft are connected and fixed to each other integrally rotatably, by screwing third nuts not shown respectively to third bolts not shown piercing first shaft side bolt through holes 522 of first joint 52 and first shaft through holes not shown of the first shaft.

Second joint unit 6 is a joint unit connected to collar shaft 4 via a second friction stir welding part W2, and includes a second joint base section 61 for connection with collar shaft 4 and a second joint 62 formed separately from second joint base section 61 and connected integrally to second joint base section 61 with second bolts B2 and second nuts N2. Second joint 62 is fastened with the second shaft not shown with bolts not shown, in the rear end of second joint unit 6. This connects the second shaft to propeller shaft PS integrally rotatably.

Second joint base section 61 includes a second annular section 611 and a plurality of (e.g., three or four) second flange yokes 612. Second annular section 611 has a substantially annular shape, and is disposed in a central part of second joint base section 61. Second flange yokes 612 extend radially outwardly from second annular section 611, and are connected to second joint 62 via second bolts B2 and second nuts N2. Second annular section 611 and second flange yokes 612 are formed integrally and made of a predetermined metallic material. The central part of second joint base section 61 further includes a second bush hole 614 facing a second central space S2 of second joint 62 described below. Second bush hole 614 is a through hole extending in the axial direction, and receives a second centering bush 63 press-fitted therein. Second annular section 611 has a wall thickness being substantially constant in the axial direction, and includes a front end including a second joint curl portion 610 formed due to plastic flow of the front end of second annular section 611 by friction stir welding. According to the present embodiment, second joint curl portion 610 and collar curl portion 430 compose second friction stir welding part W2.

Second joint 62 is a known rubber coupling having a substantially annular shape and including in its central part the second central space S2 with a substantially circular shape, and includes second bolt through holes 621 and second shaft side bolt through holes 622. Second bolt through holes 621 are arranged at substantially equal intervals in the circumferential direction, and serve for connection with second joint base section 61 (i.e., connection with second flange yokes 612). Second shaft side bolt through holes 622 are arranged at substantially equal intervals between second bolt through holes 621 in the circumferential direction, and serve for connection with the second shaft not shown. Second joint 62 and second joint base section 61 are connected and fixed to each other integrally rotatably, via second bolts B2 piercing second bolt through holes 621 and via second nuts N2 fastened to second bolts B2. Similarly, second joint 62 and the second shaft are connected and fixed to each other integrally rotatably, via fourth bolts not shown piercing second shaft side bolt through holes 622 and via fourth nuts not shown fastened to the fourth bolts.

Boot 7 has an accordion cylindrical shape, and is interposed between sleeve shaft 2 and stub shaft 3 so as to surround a connection part of sleeve shaft 2 and stub shaft 3, and overlap with both of sleeve shaft 2 and stub shaft 3. Boot 7 is made of resin such as a polypropylene (PP) and an ethylene propylene diene rubber (EPDM), and is formed by blow molding. Boot 7 includes the boot first end 71 being the first end of boot 7 and a boot second end 72 being a second end of boot 7 each of which has a tubular shape. Boot second end 72 is fixed to an outer peripheral surface of sleeve shaft body 21 of sleeve shaft 2 by tightening (i.e., tightly binding) boot second end 72 with a boot band 8 being an annular member made of a metal or a resin. Boot first end 71 is fixed to an outer peripheral surface of middle diameter section 312 of stub shaft 3 by tightening (i.e., tightly binding) boot first end 71 with another boot band 8 being an annular member made of a metal or a resin, wherein the outer peripheral surface of middle diameter section 312 of stub shaft 3 is a surface different from large diameter section 311 of stub shaft 3 used for mounting of balance piece 9, and is stepwise reduced in diameter in comparison with large diameter section 311.

Thus, boot bands 8 exerts tightening forces (i.e., tight binding forces) on boot first end 71 and boot second end 72 such that inner peripheral surfaces of boot first end 71 and boot second end 72 respectively adhere to stub shaft 3 and sleeve shaft 2. This liquid-tightly protects the connection part of sleeve shaft 2 and stub shaft 3. Such liquid-tightly protected internal space of boot 7 contains grease sealed therein for lubrication in the connection part of sleeve shaft 2 and stub shaft 3.

(Manufacturing Method of Propeller Shaft) First, first joint base section 51 of first joint unit 5 is joined to stub shaft 3 by friction stir welding (or friction welding). Specifically, first joint base section 51 is joined to stub shaft 3 by pressing stub shaft 3 onto first joint base section 51 while fixing first joint base section 51 and rotating stub shaft 3, and thereby causing plastic flow of a sliding contact surface between stub shaft 3 and first joint base section 51.

In order to perform the friction stir welding of stub shaft 3 and first joint base section 51, stub shaft 3 is rotated in a friction stir welding apparatus by chucking the outer peripheral surface of large diameter section 311 of stub shaft body 31 which is a region for mounting of balance piece 9. In other words, the outer peripheral surface of large diameter section 311 of stub shaft body 31 includes a predetermined axial region secured for mounting of balance piece 9, and thus can be utilized for chucking of stub shaft 3 upon the friction stir welding. This eliminates necessity for preparing another axial region in the outer peripheral surface of stub shaft 3 separately for the chucking of stub shaft 3 upon the friction stir welding of stub shaft 3 and first joint base section 51, and thereby serves for axial downsizing of stub shaft 3.

Next, first centering bush 53 is press-fitted into first bush hole 514 of first joint base section 51. Then, first joint base section 51 and first joint 52 are connected to each other by inserting first bolts B1 into first bolt through holes 521 of first joint 52 and first yoke through holes 513 of first flange yokes 512 of first joint base section 51, and screwing first nuts N1 to first bolts B1.

Subsequently, boot first end 71 of boot 7 is fastened and fixed to the outer peripheral surface of middle diameter section 312 of stub shaft 3 with boot band 8. Then, external spline 34 of stub shaft 3 joined with boot 7 is inserted and fitted into internal spline 25 of sleeve shaft 2 mounted to tube 1 beforehand, while fastening and fixing boot second end 72 of boot 7 to the outer peripheral surface of sleeve shaft body 21 of sleeve shaft 2 with boot band 8.

Lastly, propeller shaft PS is finished by measuring imbalance of propeller shaft PS after mounting of boot 7, and preparing balance piece 9 in accordance with a result of the measurement, and mounting and fixing the balance piece 9 to the outer peripheral surface of large diameter section 311 of stub shaft 3 by spot welding.

(Effects of First Embodiment) As described above, recently, a propeller shaft including a front end connected to a transmission of a vehicle via a rubber joint (or a rubber coupling) instead of a constant speed joint is under development for more effective reduction of vibration in the propeller shaft. In this case, the propeller includes a spline fitting part structured for expansion and contraction of the propeller shaft and disposed between the rubber joint and a tube member, i.e., between sleeve shaft 2 and stub shaft 3. However, in case of welding balance piece 9 to sleeve shaft 2 similarly to the conventional example, the spline fitting part formed in the inner periphery of sleeve shaft 2 is likely to be deformed by heat due to the welding. Specifically, the heat of the welding causes change in a gap between internal spline 25 and external spline 34 composing the spline fitting part. This may cause another factor for imbalance in rotation of the propeller shaft, and complicate correction of the imbalance.

Furthermore, in case of welding balance piece 9 to sleeve shaft 2 similarly to the conventional example, balance piece 9 is relatively far in axial distance from first joint 52 serving for support of the propeller shaft. This impedes fine adjustment with use of balance piece 9 against the imbalance in rotation of the propeller shaft. Specifically, appropriate correction of the imbalance in rotation of the propeller shaft is difficult if balance piece 9 is far in axial distance from first joint 52 serving for support of the propeller shaft, because balance piece 9 is prepared by a predetermined weight unit such as 1 gram or 2 grams.

In view of the foregoing, propeller shaft PS according to the present embodiment produces the following effects and thereby serves to solve the problems of the conventional propeller shaft.

The power transmission shaft (propeller shaft PS) is structured to be disposed between the first shaft not shown and the second shaft not shown being the pair of rotational shafts of the vehicle, and includes: the shaft member (tube 1) that is shaped tubular, and includes the shaft first end (tube first end 11) and the shaft second end (tube second end 12) being the pair of ends in the direction of the rotational axis Z of the shaft member (tube 1), wherein the shaft first end (tube first end 11) is directed toward the first shaft; the connection tube (sleeve shaft 2) including: the insertion section (sleeve shaft insertion section 22) inserted in the shaft member (tube 1) via the shaft first end (tube first end 11); the connection tube body (sleeve shaft body 21) disposed nearer to the first shaft than the insertion section (sleeve shaft insertion section 22); and the internal spline 25 disposed inside the connection tube body (sleeve shaft body 21); the sliding unit (stub shaft 3) including: the external spline 34 inserted in the internal spline 25 in order to establish spline coupling with the internal spline 25; and the sliding unit body (stub shaft body 31) shaped tubular, and connected to the external spline 34, and disposed nearer to the first shaft than the internal spline 25; the joint unit (first joint unit 5) that is structured to connect the sliding unit (stub shaft 3) to the first shaft, and includes: the joint base section (first joint base section 51) shaped annular and connected to the sliding unit body (stub shaft body 31); and the first joint (first joint 52) integrated with the joint base section (first joint base section 51) and structured to be connected to the first shaft; the boot 7 that is shaped tubular, and overlaps with both of the connection tube body (sleeve shaft body 21) and the sliding unit body (stub shaft body 31), and includes the boot first end 71 and the boot second end 72 being the pair of ends in the direction of the rotational axis Z, wherein: the boot first end 71 is directed toward the first shaft, and is fixed to the outer periphery of the sliding unit body (stub shaft body 31); and the boot second end 72 is directed toward the second shaft, and is fixed to the outer periphery of the connection tube body (sleeve shaft body 21); and the weight member (balance piece 9) disposed between the boot first end 71 and the first joint (first joint 52) in the direction of the rotational axis Z, and mounted to the outer periphery of the sliding unit body (stub shaft body 31) by welding.

Thus, according to the present embodiment, balance piece 9 is disposed on the outer periphery of stub shaft body 31 of stub shaft 3, axially apart from the splines 25 and 34 composing the spline fitting part. This serves to suppress a gap between the splines 24 and 35 from undergoing a change upon welding of balance piece 9, and thereby suppress another factor for the imbalance in rotation of propeller shaft PS from being caused. This facilitates easy and appropriate correction of the imbalance in rotation of propeller shaft PS with use of balance piece 9.

In addition to this, the configuration of disposing balance piece 9 on the outer periphery of stub shaft body 31 shortens a distance from balance piece 9 to first joint 52 serving as a supporter of propeller shaft PS, and thereby allows balance piece 9 to approach the supporter of propeller shaft PS (i.e., first joint 52). This serves for appropriate fine adjustment with balance piece 9 against the imbalance in rotation of propeller shaft PS, and more facilitates easy and appropriate correction of the imbalance.

Furthermore, according to the present embodiment, the joint unit (first joint unit 5) is connected to the sliding unit body (stub shaft body 31) via the welding section (first joint welding section 33). The welding section (stub thin section 311*a*) has the wall thickness Ta in the radial direction with respect to the direction of the rotational axis Z, which is thinner than the wall thickness Tb of a first region (stub thick section 311*b*) of the sliding unit body (stub shaft body 31) to which the weight member (balance piece 9) is mounted.

Thus, according to the present embodiment, the wall thickness Tb of stub thick section 311*b* to which balance piece 9 is welded out of stub shaft body 31 is thicker than the wall thickness Ta of stub thin section 311*a*. This serves to suppress stub shaft body 31 from being influenced by heat (i.e., undergoing distortion by heat) upon welding of balance piece 9, and thereby reduces the heat influence due to welding of balance piece 9 which is transferred to sleeve side connection section 32 via stub shaft body 31.

Furthermore, according to the present embodiment, the first region of the sliding unit body (stub shaft body 31) to which the weight member (balance piece 9) is mounted includes a section (thickness gradual change section 311*c*) that has the radial wall thickness Tx increasing from the welding section (first joint welding section 33) toward the second shaft in the direction of the rotational axis Z.

Thus, according to the present embodiment, the wall thickness Tx in an axial section in stub shaft body 31 to which balance piece 9 is mounted increases gradually toward the second shaft, i.e., toward sleeve side connection section 32. In detail, stub shaft body 31 includes thickness gradual change section 311*c* that is formed between stub thin section 311*a* and stub thick section 311*b* so as to have the wall thickness Tx gradually increasing from stub thin section 311*a* to stub thick section 311*b*. The configuration of forming the thickness gradual change section 311*c* serves to mitigate concentration of stresses in a boundary between stub thin section 311*a* and stub thick section 311*b*, in comparison with a case of directly connecting the stub thin section 311*a* to stub thick section 311*b*.

Furthermore, according to the present embodiment, the first region of the sliding unit body (stub shaft body 31) to which the weight member (balance piece 9) is mounted includes a section (stub thick section 311*b*) that has the radial wall thickness Tb constant in the direction of the rotational axis Z.

Thus, according to the present embodiment, the wall thickness of stub shaft body 31 to which balance piece 9 is mounted, i.e., the wall thickness Tb of stub thick section 311*b* of stub shaft body 31 is constant in the axial direction. This serves to make the influence by heat (i.e., the distortion by heat) upon welding of balance piece 9 constant through an axial range of stub thick section 311*b*, regardless of where balance piece 9 is welded. This improves propeller shaft PS in quality controllability and yield.

Furthermore, according to the present embodiment, the sliding unit body (stub shaft body 31) includes: the large diameter section 311 to which the weight member (balance piece 9) is mounted; and the middle diameter section 312 that is less in diameter than the large diameter section 311, and is disposed nearer to the external spline 34 than the large diameter section 311, wherein the boot first end 71 is fixed to the middle diameter section 312.

Thus, according to the present embodiment, boot 7 is mounted to a surface different from a surface to which balance piece 9 is mounted. Specifically, boot 7 is fixed to middle diameter section 312 of stub shaft body 31 less in diameter than large diameter section 311 of stub shaft body 31 to which balance piece 9 is welded. This serves to suppress boot first end 71 from interfering with balance piece 9 and a positioning jig for balance piece 9 upon welding of balance piece 9, and thereby facilitate the welding of balance piece 9.

Furthermore, according to the present embodiment, the joint unit (first joint unit 5) is connected to the sliding unit body (stub shaft body 31) via the welding section (first joint welding section 33). The weight member (balance piece 9) is disposed on a side of the sliding unit body (stub shaft body 31) with respect to the welding section (first joint welding section 33) in the direction of the rotational axis Z.

In case of disposing balance piece 9 on a side of first joint unit 5, first joint unit 5 (in detail, first joint base section 51) is required to secure a large axial region for mounting of balance piece 9. However, such configuration of securing a large axial region in first joint unit 5 (first joint base section 51) impedes ensuring of sufficient productivity of first joint unit 5 upon forming first joint unit by, for example, forging.

On the other hand, the present embodiment is configured to dispose balance piece 9 not on the side of first joint unit 5 (first joint base section 51) but on the side of stub shaft body 31 with respect to first joint welding section 33 as a boundary, and thereby serves to ensure sufficient productivity of first joint unit 5. Moreover, the configuration of disposing balance piece 9 on the side of stub shaft body 31 prevents balance piece 9 from excessively approaching first joint unit 5 (in detail, first joint 52), and thereby serves to ensure sufficient workability for welding of balance piece 9.

Furthermore, according to the present embodiment, the joint unit (first joint unit 5) is connected to the sliding unit body (stub shaft body 31) via the welding section (first joint welding section 33). The weight member (balance piece 9) is apart from the welding section (first joint welding section 33) in the direction of the rotational axis Z.

Thus, according to the present embodiment, balance piece 9 is mounted at a position axially apart from first joint welding section 33, such that balance piece 9 and first joint welding section 33 have a predetermined gap G therebetween. This serves to suppress balance piece 9 and first joint welding section 33 from interfering with each other, and thereby suppress balance piece 9 from being welded overlapping with first joint welding section 33 upon welding of balance piece 9. This serves to ensure welding strength of balance piece 9, and improve propeller shaft PS in in quality and controllability and yield.

Figure 3:
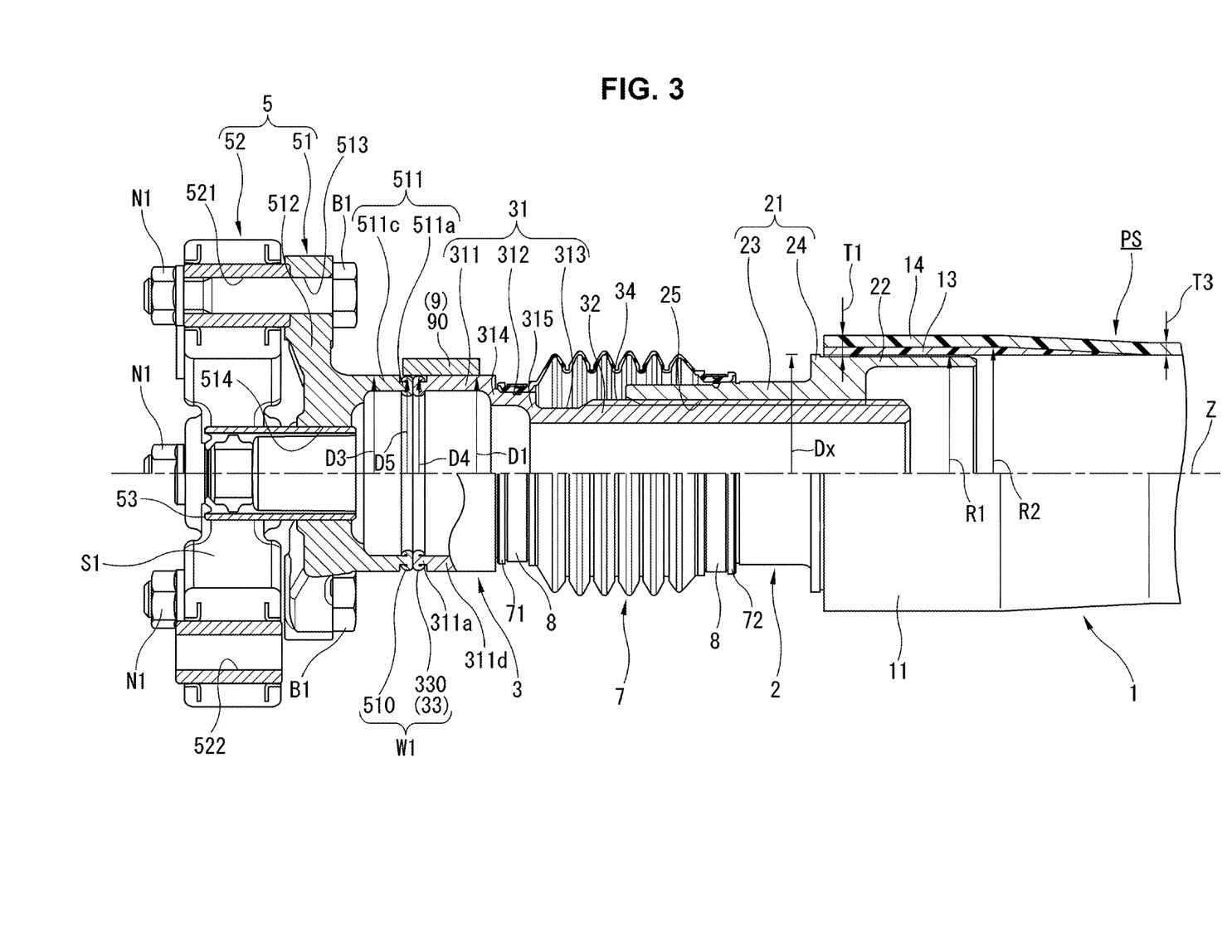
FIG. 3 is an enlarged view of a focused part of a power transmission shaft according to a second embodiment of the present invention.

[Second Embodiment] FIG. 3 shows a power transmission shaft according to a second embodiment of the present invention, in which balance piece 9 is changed in position in propeller shaft PS, in comparison with the first embodiment above. The basic configurations other than this change are same with the first embodiment. Accordingly, the same configurations with the first embodiment is represented by the same reference numerals, and explanation for such configurations is omitted. In the following description, for convenience of explanation, the left side in FIG. 3 is referred to as "front" side, and the right side in FIG. 3 is referred to as "rear" side. Furthermore, "axial direction" refers to a direction along rotational axis Z in FIG. 3, and "radial direction" refers to a direction perpendicular to the rotational axis Z, and "circumferential direction" refers to a direction around the rotational axis Z.

FIG. 3 is an enlarged view of a focused part of propeller shaft PS according to the second embodiment of the present invention, and shows, similarly to FIG. 2, a half sectional view enlarging a front end part of propeller shaft PS: in detail, enlarging a part on the front side with respect to tube first end 11 of propeller shaft PS.

As shown in FIG. 3, propeller shaft PS according to the present embodiment is configured such that, in and around first friction stir welding part W1, each of outer radius D1 of large diameter section 311 of stub shaft body 31 and an outer radius D3 of first annular section 511 of first joint base section 51 is greater than an outer radius of first friction stir welding part W1, i.e., greater than an outer radius D4 of stub curl portion 330 and an outer radius D5 of first joint curl portion 510.

In more detail, according to the present embodiment, large diameter section 311 of stub shaft body 31 includes stub thin section 311a joined to first joint unit 5 by friction stir welding and a stub thick large diameter section 311d disposed adjacently to a rear end of stub thin section 311a and increased in diameter to form a step in comparison with stub thin section 311a. Stub thin section 311a includes a front end joined to first joint unit 5 by friction stir welding, and includes stub curl portion 330 formed in an outer periphery of the front end due to the friction stir welding, similarly to the first embodiment. Stub thick large diameter section 311d has outer radius D1 substantially constant in the axial direction, wherein the outer radius D1 is greater than the outer radius of first friction stir welding part W1, i.e., greater than outer radius D4 of stub curl portion 330 and outer radius D5 of first joint curl portion 510.

According to the present embodiment, stub thin section 311a and stub thick large diameter section 311d are same with each other in inner radius R3 so as to flatly continue to each other in the axial direction, because stub thick large diameter section 311d is increased in diameter radially outwardly. Inner radius R3 of stub thin section 311a and stub thick large diameter section 311d is greater than an inner radius of first friction stir welding part W1, i.e., greater than an inner radius R4 of stub curl portion 330 and an inner radius R5 of first joint curl portion 510. According to this configuration of setting the inner radius R3 of stub thin section 311a and stub thick large diameter section 311d to be greater than inner radius R4 of stub curl portion 330 and inner radius R5 of first joint curl portion 510, stub thin section 311a and stub thick large diameter section 311d are prevented from being thicker than necessary. This serves for weight reduction of stub shaft 3.

Similarly, according to the present embodiment, first annular section 511 of first joint base section 51 includes first joint thin section 511a joined to stub shaft 3 by the friction stir welding and a first joint thick large diameter section 511c disposed adjacently to a front end of first joint thin section 511a and increased in diameter to form a step in comparison with first joint thin section 511a. First joint thin section 511a includes a rear end joined to stub shaft 3 by the friction stir welding, and includes first joint curl portion 510 formed in an outer periphery of the rear end due to the friction stir welding, similarly to the first embodiment. First joint thick large diameter section 511c has outer radius D3 substantially constant in the axial direction, wherein the outer radius D3 is greater than the outer radius of first friction stir welding part W1, i.e., greater than outer radius D4 of stub curl portion 330 and outer radius D5 of first joint curl portion 510.

As described above, according to the present embodiment, the joint unit (first joint unit 5) is connected to the sliding unit body (stub shaft body 31) by friction stir welding, via the first friction stir welding part (first friction stir welding part W1) formed due to the friction stir welding. The first friction stir welding part (first friction stir welding part W1) is interposed in the direction of the rotational axis Z by sections each of which is greater in diameter than the curl portion (stub curl portion 330) formed due to the friction stir welding. The weight member (balance piece 9) is disposed to overlap with the first friction stir welding part (first friction stir welding part W1) in the direction of the rotational axis Z.

Thus, according to the present embodiment, each of outer radiuses D3 and D1 of front and rear parts interposing first friction stir welding part W1 is greater than the outer radius of first friction stir welding part W1 (i.e., outer radius D4 of stub curl portion 330 or outer radius D5 of first joint curl portion 510), so as to allow balance piece 9 to overlap with first friction stir welding part W1 in the axial direction. In detail, balance piece 9 is welded to stub thick large diameter section 311d, and is disposed such that a front end of balance piece 9 overlaps with first friction stir welding part W1 in the axial direction. This suppresses balance piece 9 from interfering with first friction stir welding part W1 (in detail, stub curl portion 330 and first joint base section 51) even if balance piece 9 is welded with a misposition in the axial direction. This improves propeller shaft PS in yield.

In addition to this, the configuration of allowing balance piece 9 to overlap with first friction stir welding part W1 allows balance piece 9 to more approach first joint unit 5. This more facilitates fine adjustment against the imbalance in rotation of propeller shaft PS.

The present invention is not limited to the configurations or the aspects exemplified in the above embodiments, and may be freely modified depending on specifications, costs, etc. of an application target, provided producing the effects of the present invention described above.

For example, although the above embodiments show the first shaft being the output shaft of the transmission of the vehicle and the second shaft being the input shaft of the differential of the vehicle, they may be reversed.

In case of a vehicle including a transmission on a side of drive wheels (i.e., rear wheels), the first shaft may be an output shaft of an engine and the second shaft may be an input shaft of the transmission, or they may be reversed.

Moreover, the present invention may be applied to a vehicle employing an electric motor as a continuous transmission instead of the above transmission.

Furthermore, although the above embodiments of the present invention solve the technical task of buffering an influence of heat in the spline fitting part composed of internal spline 25 and external spline 34, by mounting balance piece 9 to stub shaft body 31 of stub shaft 3, other embodiments may be employed. For example, it is allowed to lengthen first joint base section 51 of first joint unit 5 rearward and mount balance piece 9 to the lengthened first joint base section 51.

The following exemplifies conceivable aspects of a power transmission shaft according to the embodiments described above.

According to one aspect, a power transmission shaft is structured to be disposed between a first shaft and a second shaft being a pair of rotational shafts of a vehicle, and includes: a shaft member that is shaped tubular, and includes a shaft first end and a shaft second end being a pair of ends in a direction of a rotational axis of the shaft member, wherein the shaft first end is directed toward the first shaft; a connection tube including: an insertion section inserted in the shaft member via the shaft first end; a connection tube body disposed nearer to the first shaft than the insertion section; and an internal spline disposed inside the connection tube body; a sliding unit including: an external spline inserted in the internal spline in order to establish spline coupling with the internal spline; and a sliding unit body shaped tubular, and connected to the external spline, and disposed nearer to the first shaft than the internal spline; a joint unit that is structured to connect the sliding unit to the first shaft, and includes: a joint base section shaped annular and connected to the sliding unit body; and a first joint integrated with the joint base section and structured to be connected to the first shaft; a boot that is shaped tubular, and overlaps with both of the connection tube body and the sliding unit body, and includes a boot first end and a boot second end being a pair of ends in the direction of the rotational axis, wherein: the boot first end is directed toward the first shaft, and is fixed to an outer periphery of the sliding unit body; and the boot second end is directed toward the second shaft, and is fixed to an outer periphery of the connection tube body; and a weight member disposed between the boot first end and the first joint in the direction of the rotational axis, and mounted to the outer periphery of the sliding unit body by welding.

According to a favorable aspect of the power transmission shaft, the joint unit is connected to the sliding unit body via a welding section of the sliding unit; and the welding section is thinner in wall thickness in a radial direction with respect to the direction of the rotational axis than a first region of the sliding unit body to which the weight member is mounted.

According to another favorable aspect, in addition to any one of the above aspects of the power transmission shaft, the first region of the sliding unit body to which the weight member is mounted includes a section that increases in radial wall thickness, from the welding section toward the second shaft in the direction of the rotational axis.

According to still another favorable aspect, in addition to any one of the above aspects of the power transmission shaft, the first region of the sliding unit body to which the weight member is mounted includes a section that is constant in radial wall thickness, in the direction of the rotational axis.

According to still another favorable aspect, in addition to any one of the above aspects of the power transmission shaft, the sliding unit body includes: a large diameter section to which the weight member is mounted; and a middle diameter section that is less in diameter than the large diameter section, and is disposed nearer to the external spline than the large diameter section, wherein the boot first end is fixed to the middle diameter section.

According to still another favorable aspect, in addition to any one of the above aspects of the power transmission shaft, the joint unit is connected to the sliding unit body via a welding section of the sliding unit, and the weight member is disposed on a side of the sliding unit body with respect to the welding section in the direction of the rotational axis.

According to still another favorable aspect, in addition to any one of the above aspects of the power transmission shaft, the joint unit is connected to the sliding unit body via a welding section of the sliding unit, and the weight member is apart from the welding section in the direction of the rotational axis.

According to still another favorable aspect, in addition to any one of the above aspects of the power transmission shaft, the joint unit is connected to the sliding unit body by friction stir welding, via a first friction stir welding part formed due to the friction stir welding, and the first friction stir welding part is interposed in the direction of the rotational axis by sections each of which is greater in diameter than a curl portion formed in the friction stir welding part due to the friction stir welding, and the weight member is disposed to overlap with the first friction stir welding part in the direction of the rotational axis.

The invention claimed is:

1. A power transmission shaft structured to be disposed between a first shaft and a second shaft being a pair of rotational shafts of a vehicle, the power transmission shaft comprising:
   a shaft member that is shaped tubular, and includes a shaft first end and a shaft second end being a pair of ends in a direction of a rotational axis of the shaft member, wherein the shaft first end is directed toward the first shaft;
   a connection tube including: an insertion section inserted in the shaft member via the shaft first end; a connection tube body disposed nearer to the first shaft than the insertion section; and an internal spline disposed inside the connection tube body;
   a sliding unit including: an external spline inserted in the internal spline in order to establish spline coupling with the internal spline; and a sliding unit body shaped tubular, and connected to the external spline, and disposed nearer to the first shaft than the internal spline;
   a joint unit that is structured to connect the sliding unit to the first shaft, and includes: a joint base section shaped annular and connected to the sliding unit body; and a first joint integrated with the joint base section and structured to be connected to the first shaft;
   a boot that is shaped tubular, and overlaps with both of the connection tube body and the sliding unit body, and includes a boot first end and a boot second end being a pair of ends in the direction of the rotational axis, wherein: the boot first end is directed toward the first shaft, and is fixed to an outer periphery of the sliding unit body; and the boot second end is directed toward the second shaft, and is fixed to an outer periphery of the connection tube body; and
   a weight member disposed between the boot first end and the first joint in the direction of the rotational axis, and mounted to the outer periphery of the sliding unit body by welding.

2. The power transmission shaft as claimed in claim 1, wherein:
   the joint unit is connected to the sliding unit body via a welding section; and
   the welding section is thinner in wall thickness in a radial direction with respect to the direction of the rotational axis than a first region of the sliding unit body to which the weight member is mounted.

3. The power transmission shaft as claimed in claim 2, wherein the first region of the sliding unit body to which the weight member is mounted includes a section (311c) that increases in radial wall thickness, from the welding section toward the second shaft in the direction of the rotational axis.

4. The power transmission shaft as claimed in claim 2, wherein the first region of the sliding unit body to which the weight member is mounted includes a section (311b) that is constant in radial wall thickness, in the direction of the rotational axis.

5. The power transmission shaft as claimed in claim 1, wherein the sliding unit body includes:
   a large diameter section to which the weight member is mounted; and
   a middle diameter section that is less in diameter than the large diameter section, and is disposed nearer to the external spline than the large diameter section, wherein the boot first end is fixed to the middle diameter section.

6. The power transmission shaft as claimed in claim 1, wherein:
   the joint unit is connected to the sliding unit body via a welding section; and
   the weight member is disposed on a side of the sliding unit body with respect to the welding section in the direction of the rotational axis.

7. The power transmission shaft as claimed in claim 1, wherein:
   the joint unit is connected to the sliding unit body via a welding section; and
   the weight member is apart from the welding section in the direction of the rotational axis.

8. The power transmission shaft as claimed in claim 1, wherein:
   the joint unit is connected to the sliding unit body by friction stir welding, via a first friction stir welding part formed due to the friction stir welding;
   the first friction stir welding part is interposed in the direction of the rotational axis by sections each of which is greater in diameter than a curl portion formed in the friction stir welding part (W1) due to the friction stir welding; and
   the weight member is disposed to overlap with the first friction stir welding part in the direction of the rotational axis.

* * * * *